United States Patent [19]

Schuit

[11] Patent Number: 4,793,630
[45] Date of Patent: Dec. 27, 1988

[54] MULTI-PIVOT VEHICLE SUSPENSION

[76] Inventor: Johannes Schuit, 1433 Camilo Trillado, Carpinteria, Calif. 93013

[21] Appl. No.: 34,611

[22] Filed: Apr. 6, 1987

[51] Int. Cl.$^4$ .............................................. B60F 11/18
[52] U.S. Cl. .................................. 280/721; 280/688; 280/695; 280/6 H; 280/689
[58] Field of Search ............... 280/664, 684, 700, 6 H, 280/695, 6 R, 717, 6.1, 6.11, 721, 689, 688; 180/9.1

[56] References Cited

U.S. PATENT DOCUMENTS

| | | | |
|---|---|---|---|
| 2,905,543 | 9/1959 | Polhemus | 280/721 |
| 2,941,815 | 6/1960 | Muller | 280/721 |
| 3,017,196 | 1/1962 | McFarland | 280/721 |
| 3,386,751 | 6/1968 | Allison | 280/721 |
| 3,737,173 | 6/1973 | Boissier et al. | 280/684 |
| 3,990,725 | 11/1976 | Allison | 280/700 |
| 4,265,467 | 5/1981 | Aleck | 280/721 |
| 4,548,290 | 10/1985 | Smith | 280/684 |
| 4,641,856 | 2/1987 | Reichenbach | 280/721 |

Primary Examiner—Richard A. Bertsch
Attorney, Agent, or Firm—William W. Haefliger

[57] ABSTRACT

A vehicle suspension including a main frame, front and rear pairs of wheels, and at least one axle extending between the wheels of each pair. Two forwardly and rearwardly elongated members are pivotally carried by the frame to pivot about length axes defined by the members, with each member having front and rear turnec portions. Four supports are on the axles near the wheels, the supports terminally supporting the turned end portions, respectively for pivoting about axes that extend forwardly and rearwardly, during pivoting of the members. Structure is provided to interconnect said two elongated members to transmit torque therebetween. A torsion bar may be activated between the two wheels of the front or rear pairs of wheels.

12 Claims, 3 Drawing Sheets

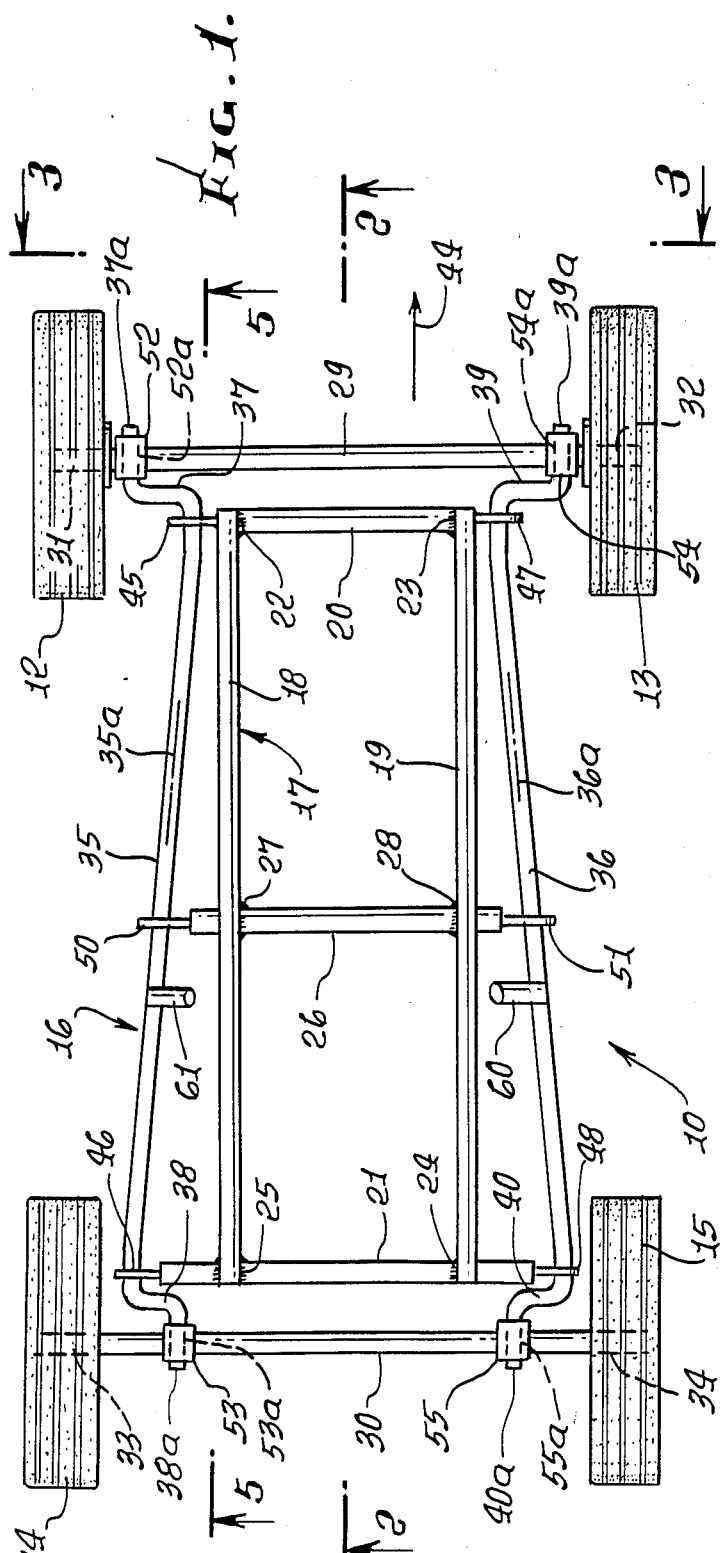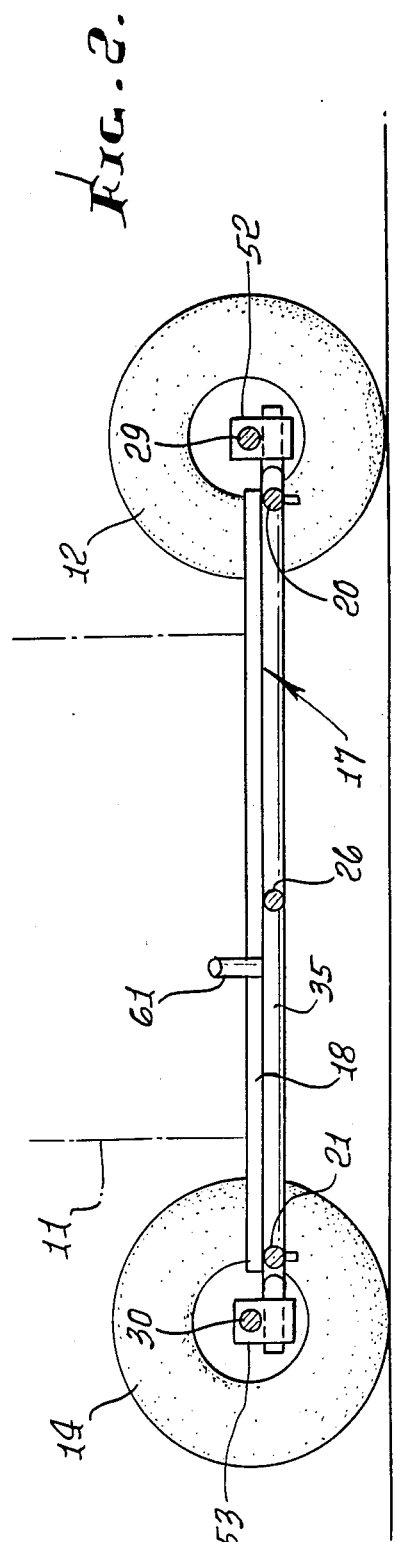

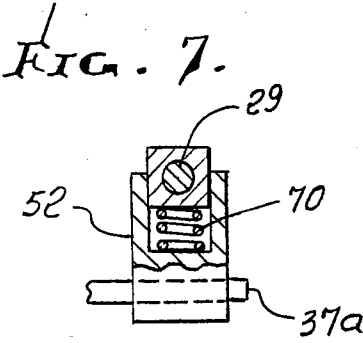
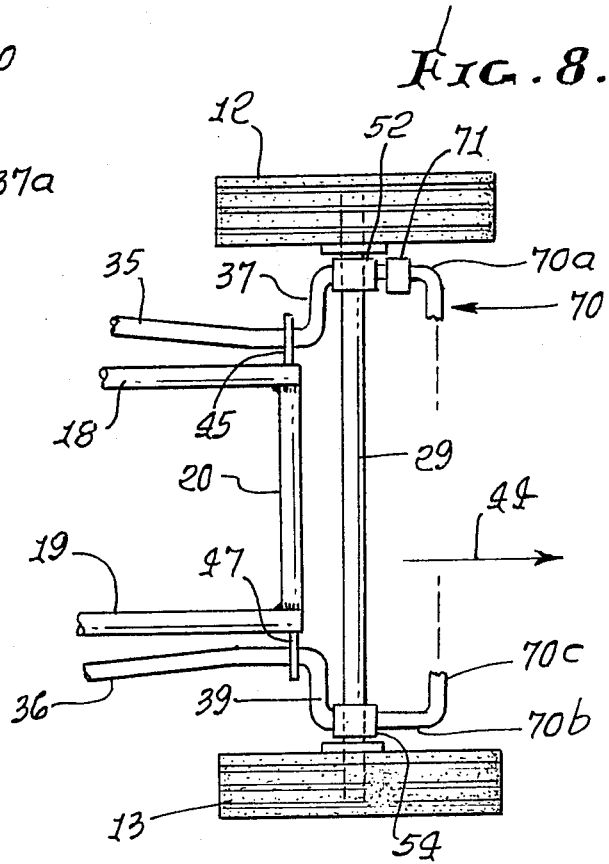
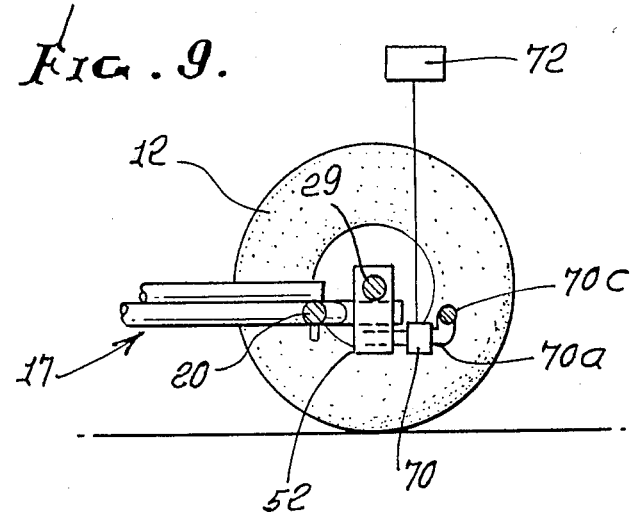

MULTI-PIVOT VEHICLE SUSPENSION

A vehicle suspension includes
 (a) a main frame,
 (b) front and rear pairs of wheels, and at least one axle extending between the wheels of each pair,
 (c) two forwardly and rearwardly elongated members pivotally carried by the frame to pivot about length axes defined by the members, each member having front and rear turned end portions,
 (d) four supports on the axles near the wheels, the supports terminally supporting the turned end portions, respectively for pivoting about axes that extend forwardly and rearwardly, during pivoting of the member,
 (e) and structure interconnecting said two elongated members to transmit torque therebetween.

A torsion bar may be activated between the two wheels of the front or rear pairs of wheels.

BACKGROUND OF THE INVENTION

This invention relates to vehicle suspension, and more particularly to an improved, simple and rugged suspension allowing independent upward pivoting of vehicle wheels, and also compensating movement of suspension structure for wheels not so pivoted, as well as compensating for vehicle deceleration.

There is a continuing need for simple, rugged, and reliable vehicle suspensions; also, there is need for suspensions that allow independent pivoting of vehicle wheels as well as compensating movement of suspension elements associated with non-pivoting wheels. Further, the problem of vehicle body or chassis forward and downward rotation as during severe deceleration creates a need for suspensions that will compensate for such body or chassis rotation.

SUMMARY OF THE INVENTION

It is a major object of the invention to provide an improved suspension meeting the above needs. Basically, it comprises:
 (a) a main frame,
 (b) front and rear pairs of wheels, and at least one axle extending between the wheels of each pair,
 (c) two forwardly and rearwardly elongated members pivotally carried by the frame, to pivot about length axes defined by the members each member having front and rear turned end portions,
 (d) four supports on the axles near the wheels, the supports terminally supporting said turned end portions, respectively, for pivoting about axes that extend forwardly and rearwardly, during pivoting of said members,
 (e) and means interconnecting said two elongated members to transmit torque therebetween.

Typically, the front and rear turned end portions associated with each of the members may extend laterally, in opposite directions, one of such turned end portions extending toward a first wheel and the other of the turned end portions extending away from a second wheel, such wheels being longitudinally spaced apart.

Further, as well appear, the two elongated members may advantageously taper, longitudinally, relative to one another; and means such as a link interconnects the two members to effect their pivoting in the same sense, about their length axes, in response to pivoting elevation of any wheel relative to other wheels. In this regard, the means to transmit torque between the members may comprise or include an actuator operable to effect controlled relative pivoting of said members about their length axes.

In addition, the vehicle main frame may be carried by the elongated members to tilt about a lateral axis in response to relative rotation of said members about their length axes; and a ground proximity sensor may be carried by the frame, and an actuator operatively connected with said sensor and also with at least one of said members to effect controlled relative pivoting thereof, about their length axes, to controllably tilt said frame as a function of ground proximity. Spring means typically supports at least one of the wheels so that said means is compressed in response to braking of the vehicle, and tending to cause the vehicle front end to pitch downward.

These and other objects and advantages of the invention, as well as the details of an illustrative embodiment will be more fully understood form the following specification and drawings, in which:

DRAWING DESCRIPTION

FIG. 1 is a top plan view of a vehicle suspension system incorporating the invention;

FIG. 2 is a side elevation taken on lines 2—2 of FIG. 1;

FIG. 7 is a fragmentary view showing a modification providing spring support for an axle;

FIGS. 8 and 9 are modified fragmentary views like FIGS. 1 and 2.

DETAILED DESCRIPTION

Figure 3:
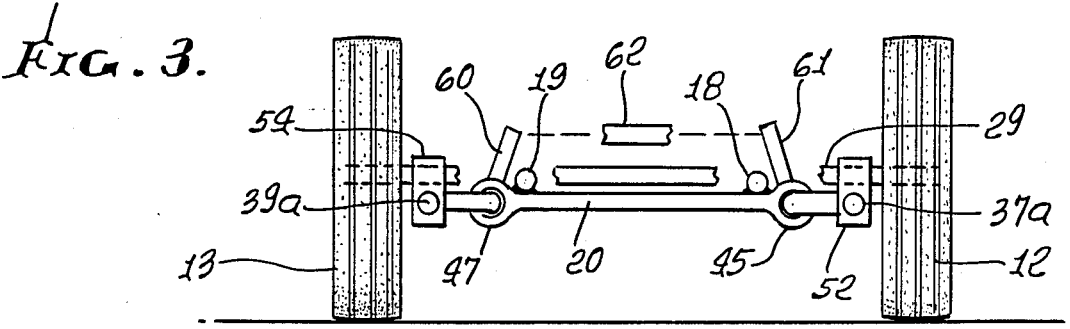
FIG. 3 is an end elevation taken on lines 3—3 of FIG. 1.

In FIGS. 1-3, a vehicle 10 includes a body 11, four wheels, 12-15, and a suspension system 16 suspended by the wheels and carrying the body. The suspension system includes a main frame 17 having longitudinally elongated, parallel members 18 and 19 which are laterally spaced apart, and laterally elongated parallel members 20 and 21 which are longitudinally spaced apart. These members are connected, as by welding, for example, at corner location 22-25. A laterally elongated cross-piece 26 is located intermediate the members 20 and 21, and is connected to members 18 and 19 as at weld locations 27 and 28. A rigid frame assembly is thus provided.

The front wheels 12 and 13 are interconnected by an axle 29, and the rear pair of wheels is interconnected by an axle 30. Suitable bearings journal the wheels on the axles, as at locations 31-34.

In accordance with the invention, to forwardly and rearwardly elongated members are pivotally carried by the frame, to pivot about length axes defined by the members, each member having front,and rear turned end portions. See for example the elongated members 35 and 36 defining axes 35a and 36a about which they are pivotable. Member 35 has front and rear turned end portions or legs 37 and 38 leg 37 turned outwardly toward wheel 12, and leg 38 turned inwardly away from wheel 14. Member 36 has front and rear turned end portions or legs 39 and 40, leg 39 turned outwardly toward wheel 13, and leg 40 turned inwardly away from wheel 15. Thus, legs 37 and 39 extend laterally in generally opposite directions, depending upon the extent of their relative pivoting; and legs 38 and 40 extend laterally and in generally opposite directions depending upon the extent of their relative pivoting. Note also that the members 35 and 36 mutually taper in the longitudinal direction of arrow 44.

The elongated members 35 and 36 are pivotally carried by the frame to allow them to pivot about axes 35a and 36a, relative to the frame, and independently of one another. See for example, the fore and aft journals at 45 and 46 for member 35, and the fore and aft journals 47 and 48 for member 36. The journals are carried by the lateral members 20 and 21, as shown. See also additional journals 50 and 51 for the respective members 35 and 36, carried by cross piece 26, at its opposite ends.

Further, four supports 52–55 are carried on the axles, as shown, and they terminally support the turned end portions or legs, as per the following:

TABLE

| Support: | Supports terminal: | Of leg: |
|---|---|---|
| 52 | 37a | 37 |
| 53 | 38a | 38 |
| 54 | 39a | 39 |
| 55 | 40a | 40 |

Figure 4:
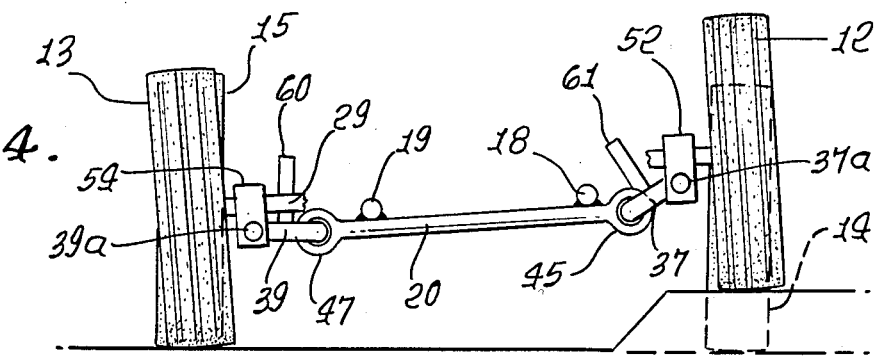
FIG. 4 is a view like FIG. 3 showing suspension elements shifted in positions due to elevation of one wheel.

The terminals 37a–40a extend forwardly and rearwardly, parallel to arrow 44, and they define associated axes that extend forwardly and rearwardly and about which the terminals are pivotable in journals 52a–55a defined by the supports 52–55, respectively, in response to pivoting of the members 35 and 36 about their axes 35a and 36a. Thus, as wheel, 12 elevates relative to the other wheels, axle 29, tilts as seen n FIG. 4, leg terminal and rotates counterclockwise in journal 52a so that the forward end of member 35 is lowered relative to axle 29, and the forward part of the frame, as represented by cross piece 20, is not tilted up to the angular degree that axle 29 is (although the entirely of crosspiece 20 is elevated), while the rear part of the frame as represented by crosspiece 21 undergoes tilting to the same degree as cross piece 20, but one end of crosspiece 21 is elevated relative to axle 30 whereas the opposite end of crosspiece 21 is depressed relative to axle 30. Thus, the net effect is that each wheel may become elevated relative to other wheel, as by road obstructions, with minimum disturbance to the frame and body, and no springs or spring associated mechanism complexity is required.

Figure 5:
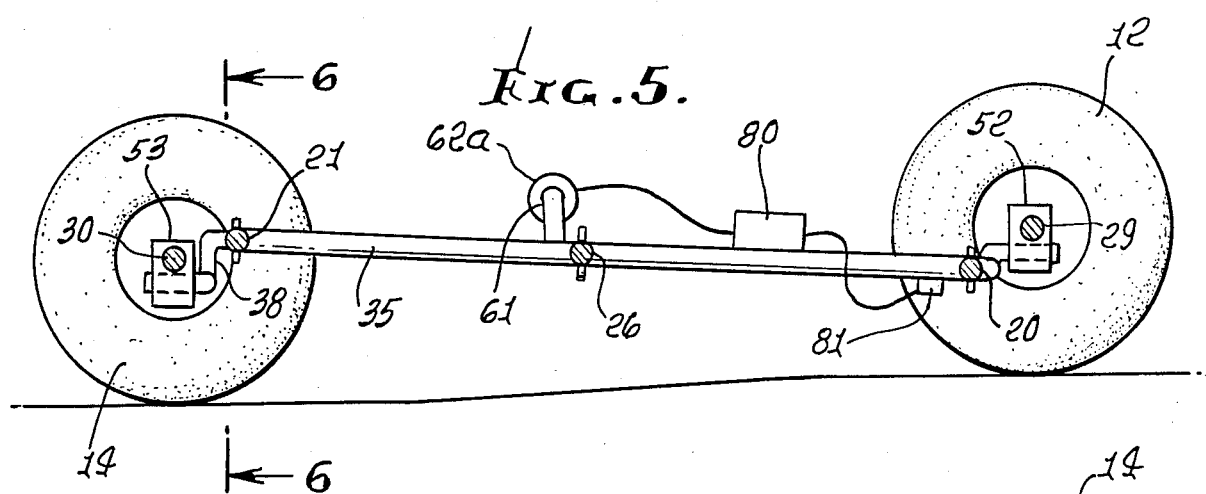
FIG. 5 is a view like FIG. 2, but showing suspension elements shifted in positions due to elevation of certain wheels.
Figure 6:
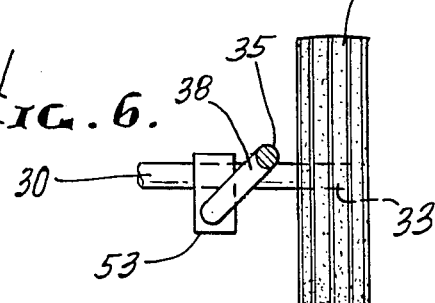
FIG. 6 is a section on lines 6—6 of FIG. 5.

Also provided is means interconnecting the two elongated members 35 and 36, to transmit torque therebetween; and typically, such means may interconnect the members 35 and 36 to allow their pivoting in the same sense, about their length axes, in response to elevation of any wheel relative to other wheels. For example, note the two stub shafts or projections 60 and 61 respectively connected to the members 35 and 36, and projecting upwardly, as in FIG. 3. When wheel 12 is elevated as in FIG. 4, both members 35 and 36 are rotated counterclockwise as viewed in FIG. 4, as are the projections 60 and 61. A link 62 may be pivotally and suitably connected between the projections, as shown, offset from the plane defined by members 35 and 36. The link 62 may be replaced by an actuator (represented by 62), operable to effect controlled relative pivoting of the members 35 and 36; thus as the actuator is expanded lengthwise, projection 60 rotates clockwise and projection 61 rotates counterclockwise. The result is that the frame forward crosspiece 20 elevates and the rearward crosspiece 21 is lowered, the fulcrum for such pivoting provided by the journals 50 and 51. The opposite effect is also true, as shown in FIG. 5, with the front crosspiece 20 lowered relative to axel 29, and the rear crosspiece 21 of the frame elevated relative to rear wheel axle 30. This then allows the provision of actuator means to controllably tilt the vehicle frame about a lateral axis between the front and rear of the frame; and the element 62 is representative of such an actuator. See also the actuator 62a in FIG. 5.

If the vehicle frame is additional supported by springs, so that the front of the vehicle tends to drop in response to braking (an effect also produced by downward compression of pneumatic tires at the front wheels), such tilting of the frame and body can then be compensated for by the actuator 67a which correspondingly rotates members 35 and 36 to raise the frame front end a compensating amount. See for example the spring support at 70 of a wheel axle 29 by the support 52.

A proximity sensor 80 may then be carried by the tiltable frame, to sense the proximity of ground level to the frame, or vice versa. The sensor is connected to feed back circuitry 81 controlling the actuator 62a, so as to maintain the frame at the sensor location at fixed distance from the ground (by controlled tilting of the frame as the springs compress and expand during braking, deceleration, etc.).

FIGS. 8 and 9 are modified fragmentary views like FIGS. 1 and 2, showing provision of an "anti-sway" bar 70 extending between and connected to supports 52 and 54. The bar is generally U-shaped, having turned ends 70a and 70b attached to the supports 52 and 54. The bar also has a transversely elongated "torsion" section 70c integral with and extending between ends 70a and 70b. A clutch 71 is connected between portions of turned end 70a, and when the clutch is energized, the end 70a is made integral to act like integral end 70b, at which time the anti-sway bar yieldably resists raising or lowering of one wheel relative to the others (see wheels 12 and 13); i.e. torsion section 70c torsionally resists such lowering or raising. The extent of the axle 29 between supports 52 and 54 may be eliminated, under such circumstances.

When clutch 71 is de-energized, the effect of the bar 70 is eliminated. The clutch can be of various types, such as electrical (see control 72, therefor, operable from the interior of the vehicle), or hydraulic, or mechanical.

Such a "sway bar" may also or alternatively be connected between the supports for the rear pair of wheels.

I claim:

1. In a vehicle suspension, the combination comprising:
    (a) a main frame extending forwardly and rearwardly,
    (b) front and rear pairs of wheels, and axles for the wheels of said pairs,
    (c) two forwardly and rearwardly elongated members pivotally carried by the frame at forward and rearward locations on the frame for pivoting of the members about length axes defined by the members, each member having front and rear turned end portions and being continuous therebetween,
    (d) four supports on the axles near the wheels, the supports terminally supporting said turned end portions, respectively for pivoting about axes that extend forwardly and rearwardly, during pivoting of said members, (e) and means interconnecting said two elongated members to transmit torque therebetween, said last named means comprising and actuator operable to effect controlled relatively opposite pivoting of said members about their length axes, to cause said frame forward and rearward locations to move vertically oppositely.

2. The combination of claim 1 wherein said front and rear turned end portions associated with each of the members extend laterally, in generally opposite directions.

3. The combination of claim 2 wherein one of said front and rear turned end portions extends toward a first wheel and the other of said turned end portions extends away from a second wheel, said first and second wheels being longitudinally spaced apart.

4. The combination of claim 1 wherein the two elongated members taper, longitudinally, relative to one another.

5. In a vehicle suspension the combination comprising:
(a) a main frame extending forwardly and rearwardly,
(b) front and rear pairs of wheels, and axles for the wheels of said pairs,
(c) two forwardly and rearwardly elongated members pivotally carried by the frame at forward and rearward locations on the frame, for pivoting of the members, about length axes defined by the members, each member having front and rear turned end portions, and being continuous therebetween,
(d) four supports on the axles near the wheels, the supports terminally supporting said turned end portions, respectively for pivoting about axes that extend forwardly and rearwardly, during pivoting of said members,
(e) and means interconnecting said two elongated members to transmit torque therebetween and to allow pivoting of said members in the same sense, about their length axes, in response to elevation of any wheel relative to other wheels and also to allow pivoting of said members in opposite sense to cause said frame forward and rearward locations to move vertically oppositely.

6. The combination of claim 5 wherein said e) mean comprises a link offset from a plane defined by said members.

7. In a verticle suspension, the combination comprising:
(a) a main frame extending forwardly and rearwardly,
(b) front and rear pairs of wheels, and axles for the wheels of said pairs,
(c) two forwardly and rearwardly elongated members pivotally carried by the frame at forward and rearward locations on the frame, for pivoting of the members, about length axes defined by the members, each member having front and rear turned end portions, and being continuous therebetween,
(d) four supports on the axles near the wheels, the supports terminally supporting said turned end portions, respectively for pivoting about axes that extend forwardly and rearwardly, during pivoting of said members,
(e) and means interconnecting said two elongated members to transmit torque therebetween and to effect relative opposite pivoting thereof,
(f) said frame being carried by said elongated members to tilt about a lateral axis in response to relatively opposite rotation of said members about their length axes.

8. The combination of claim 7 including a ground proximity sensor carried by the frame, and an actuator operatively connected with said sensor and also with at least one of said members to effect controlled relative pivoting thereof, about their length axes, to controllably tilt said frame as a function of ground proximity.

9. The combination of claim 8 including means supporting at least one pair of wheels so that said means is compressed in response to braking of the vehicle, and tending to cause the vehicle front end to pitch downward.

10. In a vehicle suspension, the combination comprising:
(a) a main frame extending forwardly and rearwardly,
(b) front and rear pairs of wheels, and axles for the wheels of said pairs,
(c) two forwardly and rearwardly elongated members pivotally carried by the frame at forward and rearward locations on the frame, for pivoting of the members, about length axes defined by the members, each member having front and rear turned end portions, and being continuous therebetween,
(d) four supports on the axles near the wheels, the supports terminally supporting said turned end portions, respectively for pivoting about axes that extend forwardly and rearwardly, during pivoting of said members,
(e) and means interconnecting said two elongated members to transmit torque therebetween and to effect relative opposite pivoting thereof,
(f) and including means torsionally resisting lifting or lowering of one of the wheels of the front or rear pairs relative to the other wheel of that pair.

11. The combination of claim 10 wherein said means comprises a U-shaped bar having turned ends respectively attached to the supports for the wheels of that pair.

12. The combination of claim 11 including a clutch connected to said bar to be energized so as to activate the bar, and alternatively to be de-energized to de-activate the bar.

* * * * *

UNITED STATES PATENT AND TRADEMARK OFFICE
CERTIFICATE OF CORRECTION

PATENT NO. : 4,793,630
DATED : December 27, 1988
INVENTOR(S) : Johannes Schuit

It is certified that error appears in the above-identified patent and that said Letters Patent is hereby corrected as shown below:

Column 5, Claim 7, line 51; "7. In a verticle suspension, the combination compris-" should read --7. In a vehicle suspension, the combination compris- --

Signed and Sealed this

Eighteenth Day of July, 1989

Attest:

DONALD J. QUIGG

Attesting Officer

Commissioner of Patents and Trademarks